United States Patent

Hachida et al.

Patent Number: 5,757,614
Date of Patent: May 26, 1998

[54] GAS INSULATED SWITCHGEAR APPARATUS

[75] Inventors: Masaki Hachida; Hirohiko Yatsuzuka; Takanobu Aoyama, all of Hitachi; Tadasuke Yamamoto, Jyuou-machi, all of Japan

[73] Assignee: Hitachi, Ltd., Tokyo, Japan

[21] Appl. No.: 579,348

[22] Filed: Dec. 27, 1995

[30] Foreign Application Priority Data

Dec. 28, 1994 [JP] Japan ................. 6-326629

[51] Int. Cl.$^6$ ............... H01H 33/00; H02B 5/00
[52] U.S. Cl. ............. 361/602; 218/79; 218/80; 218/75; 361/604; 361/605; 361/618
[58] Field of Search ............. 218/68–78, 79, 218/80; 361/604, 612, 618, 602

[56] References Cited

U.S. PATENT DOCUMENTS

| | | | |
|---|---|---|---|
| 4,032,820 | 6/1977 | Oishi et al. | 361/604 |
| 4,493,008 | 1/1985 | Haginomori | 361/612 |
| 4,736,114 | 4/1988 | Reichi | 307/11 |
| 4,745,522 | 5/1988 | Mitomo et al. | 361/612 |
| 4,862,319 | 8/1989 | Suzuyama et al. | 361/612 |
| 5,001,599 | 3/1991 | Itou et al. | 361/604 |
| 5,045,968 | 9/1991 | Suzuyama et al. | 361/618 |
| 5,453,910 | 9/1995 | Itou et al. | 361/612 |
| 5,581,439 | 12/1996 | Hachida et al. | 361/612 |

FOREIGN PATENT DOCUMENTS

| | | |
|---|---|---|
| 2 377 102 | 4/1978 | France. |
| 2-273009 | 11/1990 | Japan. |
| 4-299007 | 10/1992 | Japan. |

*Primary Examiner*—J. R. Scott
*Attorney, Agent, or Firm*—Fay, Sharpe, Beall, Fagan, Minnich & McKee

[57] ABSTRACT

A gas insulated switchgear device of a double bus type which is accommodated in a metal container filled with $SF_6$ gas includes first and second gas insulated main buses disposed horizontally and substantially in parallel with each other. Bus sectioning units section each of the first and second main buses into first and second sections. The bus sectioning units include auxiliary buses disposed outside of said first and second main buses. A branching bus connects one end of the first main bus with one end of one of the auxiliary buses via a circuit breaker. Another branching bus connects the other end of the first main bus with the other end of the one of the auxiliary buses. Still another branching bus connects one end of the second main bus with one end of another auxiliary bus. A further branching bus connects the other end of the second main bus with the other end of the other auxiliary bus. Potential transformers are provided along the branching buses.

7 Claims, 7 Drawing Sheets

GAS INSULATED SWITCHGEAR APPARATUS

BACKGROUND OF THE INVENTION

The present invention relates to an arrangement structure of a bus sectioning unit in a double bus type gas insulated switchgear device wherein potential transformers to be connected to a main bus and earthing switches used for working on the main bus are disposed in concentration.

With regard to the arrangement structure of the gas insulated switchgear devices, many investigations have been performed until now. As one prior art example, Japan Kokai Laid-open Application; JP-A-4-299007(1992) discloses a gas insulated switchgear device, in particular a bus sectioning unit therefor.

FIG. 10 shows a prior art single connection diagram of a bus sectioning unit portion in a gas insulated switchgear device and FIG. 11 shows the prior art arrangement structure thereof. The entire length L' of the bus sectioning unit including a main bus potential transformer (PT) unit 16 reaches up to 27 m and further the area required therefor is great.

SUMMARY OF THE INVENTION

An object of the present invention is to realize a compact unit by combining the main bus PT unit 16 and main bus sectioning units 3 and 4 and as well as to shorten the length of the main buses and branching buses therein and to improve the cost therefor.

In the present invention, gas circuit breakers for the bus sectioning unit are disposed further outside of both main buses and auxiliary buses, one of the branching buses led out from both poles of the gas circuit breaker is directly connected to the auxiliary bus via a disconnecting switch, the other branching bus extends up to the upper portion of the main bus passing over the auxiliary bus and is connected via a disconnecting switch and a connecting conductor to the main bus, and at the connecting conductor between the disconnecting switch and the main bus, a potential transformer to be connected to the main bus and an earthing switch used for working on the main bus are disposed. Further, at another connecting conductor connecting the main bus and the auxiliary bus without routing a circuit breaker, another potential transformer to be connected to the main bus and another earthing switch used for working on the main bus are likely disposed, thereby the arrangement structure of the gas insulated switchgear device including the above mentioned elements, according to the present invention is confined in a length within about 13.5 m which is comparable to the entire length of the conventional bus sectioning units 3 and 4.

Through the concentrated disposition of the main bus $PT_s$ and the main bus earthing switches ($ES_s$) in the bus sectioning units 3 and 4, the conventional necessity of providing an installation space for the main bus $PT_s$ and the main bus $ES_s$ in the main bus arrangement is eliminated and thus space reduction of the entire arrangement structure of the gas insulated switchgear device is realized. Further, because of the back of necessity of providing $PT_s$ for other feeder units and for main bus connecting units, a standardization of the gas insulated switchgear device is realized and thus, except for the disposition of the main bus $PT_s$ and the main bus $ES_s$, the main bus sectioning units 3 and 4 according to the present invention are constituted in the same arrangement structure as of a main bus connecting unit 14. Namely, the positional relationship and the arrangement structure of gas circuit breakers 5, either main bus 1 or 2 and auxiliary bus 6 in the main bus sectioning units 3 and 4 are identical with those of gas circuit breakers 15 and two main buses 1 and 2 in the main bus connecting unit 14. Accordingly, a standardization of elements is realized between the main bus sectioning units 3 and 4 and the main bus connecting unit 14.

DETAILED DESCRIPTION OF PREFERRED EMBODIMENTS

Hereinbelow embodiments of the present invention are explained specifically with reference to the drawings.

Figure 1:
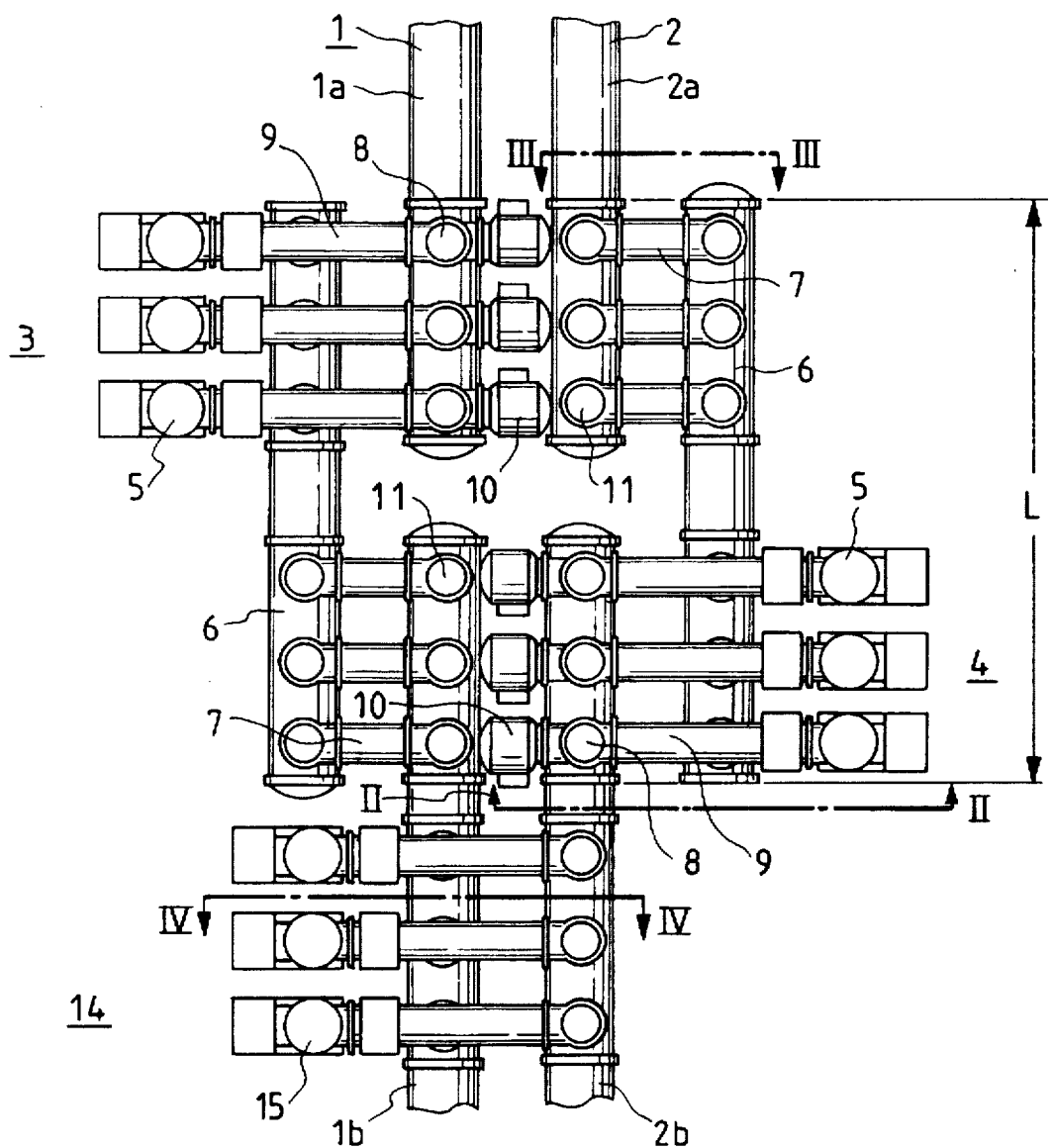
FIG. 1 is a play view of one embodiment of a gas insulated switchgear device according to the present invention.

FIG. 1 is a plan view showing a main bus sectioning unit and the vicinity thereof for a double bus type gas insulated switchgear device of one embodiment according to the present invention, wherein vertical type circuit breakers are exemplarly used for the main bus sectioning use gas circuit breakers 5.

Gas insulated main buses 1 and 2 are a three phase collective type and are disposed in an opposing manner on two parallel straight lines at substantially the same height level. Both the gas insulated main buses 1 and 2 are sectioned into two portions at the bus sectioning position, and gas insulated main bus sections 1a and 1b, and 2a and 2b are respectively to be connected by the main bus sectioning units 3 and 4.

Figure 2:
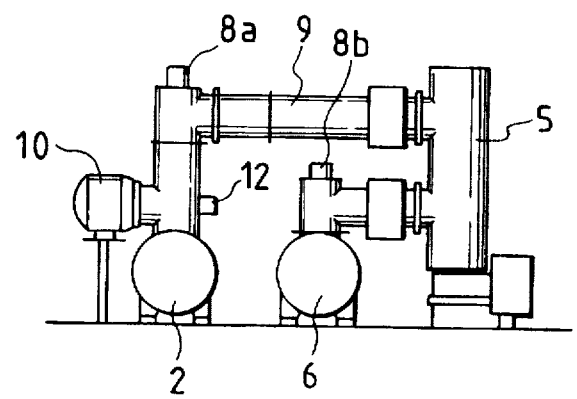
FIG. 2 is a side elevation of a bus sectioning gas circuit breaker portion taken along the line II—II in FIG. 1 of the one embodiment in a gas insulated switchgear device according to the present invention.

The main bus sectioning units 3 and 4 are primarily constituted by the gas circuit breakers 5, the gas insulated auxiliary buses 6 and gas insulated branching buses 7 or 9. The gas insulated auxiliary buses 6 are a three phase collective type and the others, for examples branching buses 7 and 9, are phase isolated type. FIG. 2 is a diagram taken along the line II—II in FIG. 1 and shows the construction structure relating primarily to the gas circuit breaker 5. The gas insulated main bus 2 and the gas insulated auxiliary bus 6 are disposed in parallel at a same height level, and further the gas circuit breaker 5 is disposed at the opposite side of the auxiliary bus 6 from the side where the main bus 2 is disposed. In the FIG. 2 embodiment, a vertical type circuit breaker is used for the gas circuit breaker 5 and the directions of two leading out conductors from the gas circuit breaker 5 toward the auxiliary bus 6 are substantially horizontal. The leading out portion from the lower portion of the circuit breaker 5 is connected to the auxiliary bus 6 via a disconnecting switch 8b which is disposed vertically above the auxiliary bus 6. The leading out portion from the upper portion of the gas circuit breaker 5 extends above the auxiliary bus 6 by means of the branching bus 9 and is connected to the main bus 2 via a disconnecting switch 8a which is disposed vertically above the main bus 2. As shown in FIG. 2, the disconnecting switch 8a disposed above the main bus 2 is not at the same height level as the disconnecting switch 8b disposed above the auxiliary bus 6 but is at a higher position in accordance with the height level of the branching bus 9. Further, at the branching bus portion between the disconnecting switch 8a and the main bus 2 a main bus connected PT 10 and a main bus use ES 12 are disposed.

Figure 3:
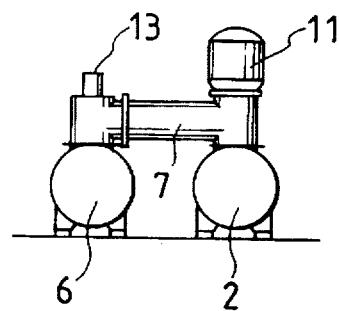
FIG. 3 is a side elevation showing a connecting portion of the main bus and the auxiliary bus taken along the line III—III in FIG. 1 of the one embodiment in the gas insulated switchgear device according to the present invention

FIG. 3 is a diagram taken along the line III—III in FIG. 1 and shows an arrangement structure relating primarily to the gas insulated branching bus 7. The gas insulated main bus 2 and the gas insulated auxiliary bus 6 are respectively provided with an upwardly directing opening portion, and branching buses led out perpendicularly from the respective opening portions are connected by the horizontal branching bus 7. Further, at the ends of the branching bus 7 a main bus connected PT 11 and a main bus use ES 13 are provided.

Figure 11:
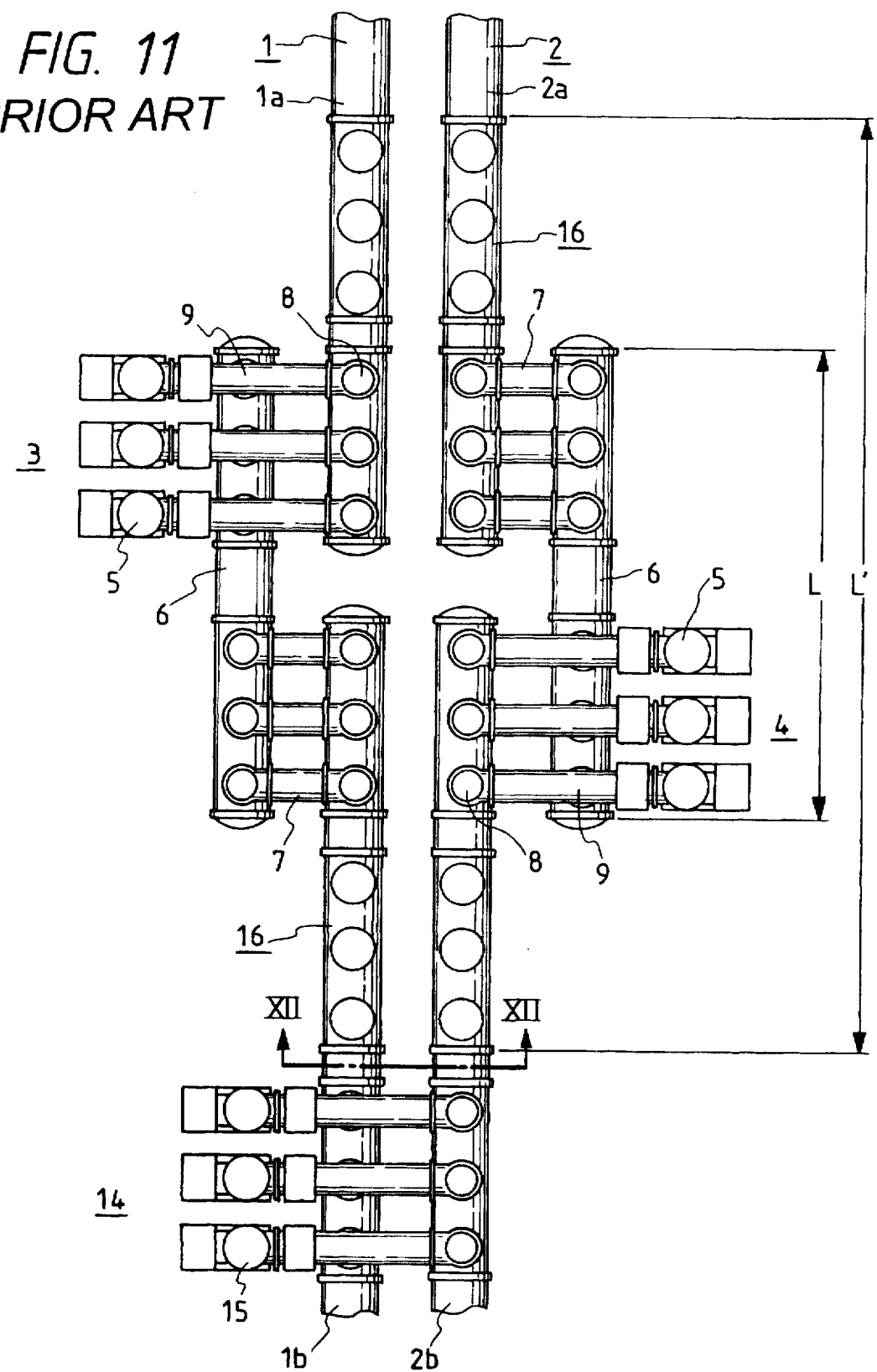
FIG. 11 is a plane view of a conventional prior art gas insulated switchgear device corresponding to the single line confection diagram shown in FIG. 10.

Thus the bus sectioning units 3 and 4 constituting the main bus connection use $PT_s$ 10 and 11 and the main bus use $ES_s$ 12 and 13 can be concentratedly disposed in the bus sectioning units 3 and 4. Accordingly, the conventionally required space for the bus PT units 16 as shown in FIG. 11 is eliminated, thereby the length in the main bus axial direction of the gas insulated switchgear device can be shortened.

Figure 4:
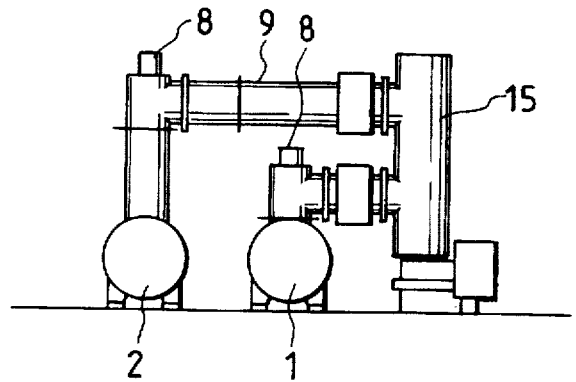
FIG. 4 is a side elevation of a bus connecting unit in the gas insulated switchgear device taken along the line. IV—IV in FIG. 1

In the arrangement structure of the bus sectioning units 3 and 4 as shown in FIG. 1 through FIG. 3 the arrangement structure including the circuit breakers 5 is formed substantially identical as that for the bus connecting units 14. Namely, when comparing FIG. 2 which shows a side view of the bus sectioning unit 4 with FIG. 4 which is a diagram taken along the line IV—IV in FIG. 1 and shows a side view of the bus connecting unit 14, it is understood that the bus sectioning units 3 and 4 are constituted by adding a set of the PT 10 and the ES 12 to the bus connecting unit 14, thus the unit constitution thereof is simplified.

These bus sectioning units 3 and 4 are disposed at the outer sides of the respective belonging main buses while facing each other. However, the location of the branching bus 9 including the gas circuit breaker 5 and the branching bus 7 with no gas circuit breaker 5 in the bus sectioning unit 3 is inverted from that in the bus sectioning unit 4, namely the bus sectioning units 3 and 4 are disposed in a rotated symmetry with respect to both the main buses. The importance thereof is explained hereinbelow.

As seen from FIG. 2, the main bus connected $PT_s$ 10 are disposed so as to project toward the space between the main buses 1 and 2 from the branching bus which is led out perpendicularly and upwardly from the respective main buses 1 and 2. Because of the disposition of the bus $PT_s$ 10 at the same height level as the facing main bus and of the rotation symmetry arrangement, the bus $PT_s$ 10 are arranged in the space between the main buses 1 and 2 in the axial direction thereof while displacing the locations thereof without enlarging the spacing distance between the main buses 1 and 2. The height of the entire arrangement structure of the bus sectioning units can be also limited.

With regard to the main bus connected $PT_s$ 10 and the main bus use $ES_s$ 12 shown in FIG. 1 and FIG. 2, the bus $PT_s$ 10 make use of gas insulated wound type transformers and are disposed in the space between the two main buses 1 and 2, and the main bus use $ES_s$ 12 are disposed at the same height level as the bus $PT_s$ 10 but at the opposite side with respect to the connecting conductor. However, the arrangement structure with regard to their connecting position and direction is not limited to the present embodiment as will be understood from the following embodiments except that the bus PT 10 and the main bus use ES 12 are to be connected to the connecting conductor between the disconnecting switch 8a and the corresponding main bus. Accordingly, the positional relationship between the main bus connected PT 10 and the main bus use ES 12 as shown in FIG. 2 can be inverted as shown in FIG. 6.

Figure 7:
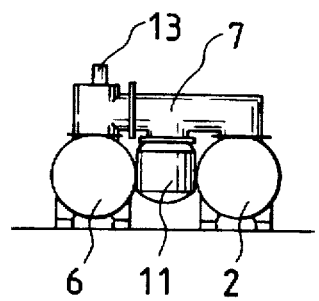
FIG. 7 is a side elevation showing a connecting portion of the main bus and the auxiliary bus taken along VII—VII in FIG. 5 of the other embodiment according to the present invention.
Figure 8:
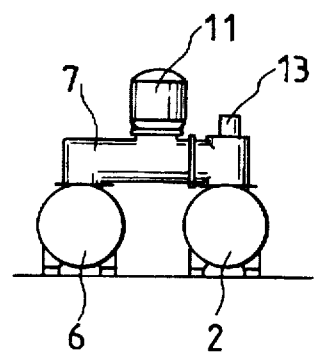
FIG. 8 is a side elevation of a connecting portion of the main bus and the auxiliary bus of still another embodiment in the gas insulated switchgear device according to the present invention.

Likely, the arrangement structure of the main bus connected PT 11 and the main bus use ES 13 with regard to their connecting position and direction as shown in FIG. 3 is not specifically limited thereto except that the main bus connected PT 11 and the main bus use ES 13 are to be connected to the branching bus 7. Therefore, the main bus connected PT 11 can be disposed so as to hang down from the branching bus 7 into the space between the main bus 2 and the auxiliary bus 6 as shown in FIG. 7, and contrary thereto the main bus connected PT 11 can be disposed so as to stand up on the branching bus 7 as shown in FIG. 8. The arrangement structure as shown in FIG. 7 improves the earth quake resistance because of the lowered center of gravity in comparison with those shown in FIGS. 3 and 8.

Figure 5:
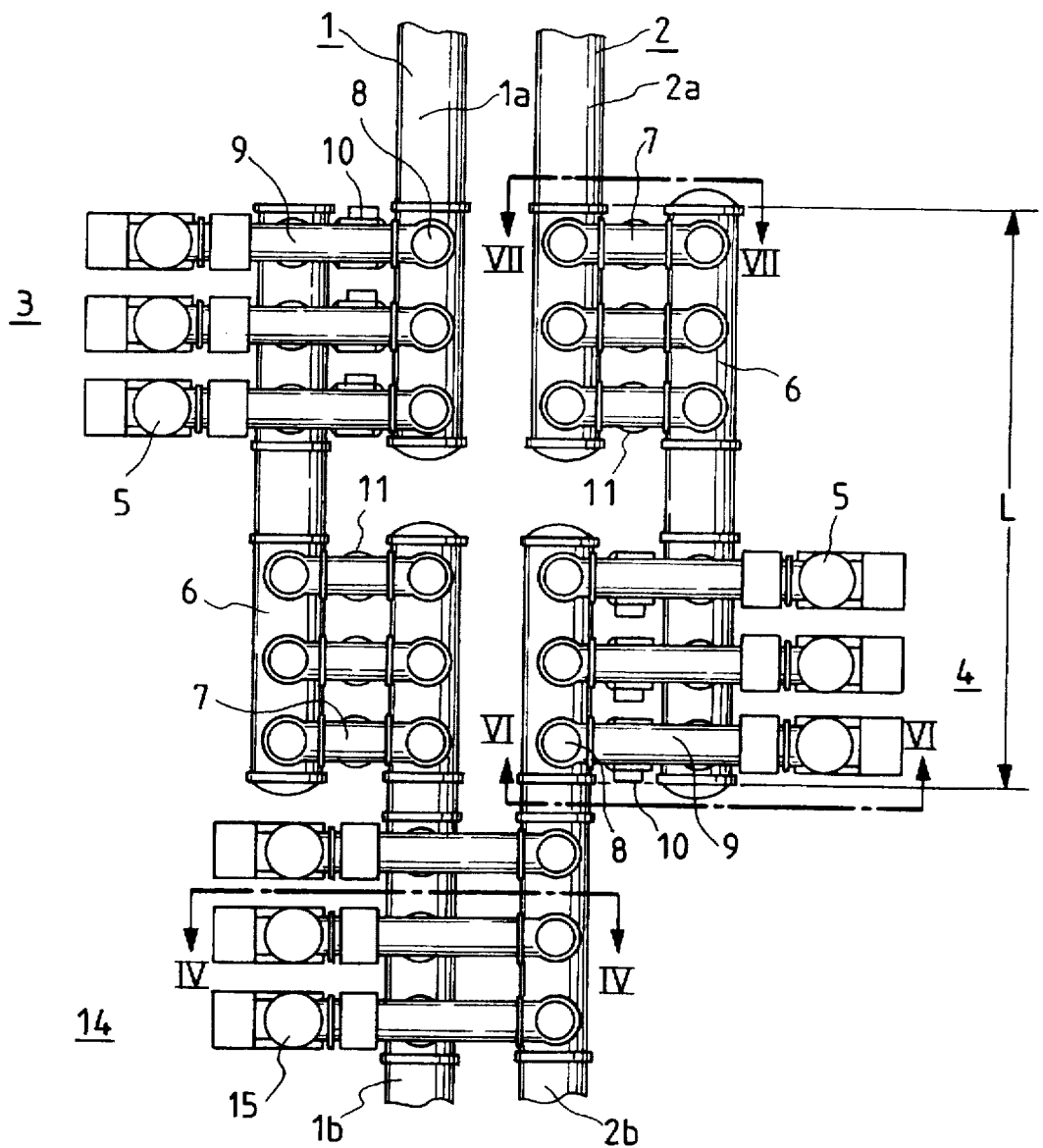
FIG. 5 is a plan view of another embodiment of a gas insulated switchgear device according to the present invention.
Figure 6:
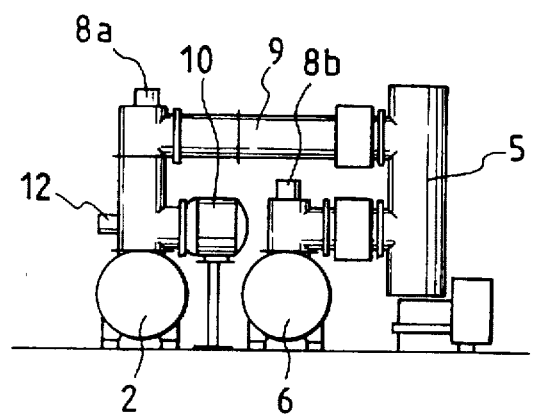
FIG. 6 is a side elevation of a bus sectioning gas circuit breaker portion taken along the line VI—VI in FIG. 5 of the other embodiment in the gas insulated switchgear device according to the present invention
Figure 9:
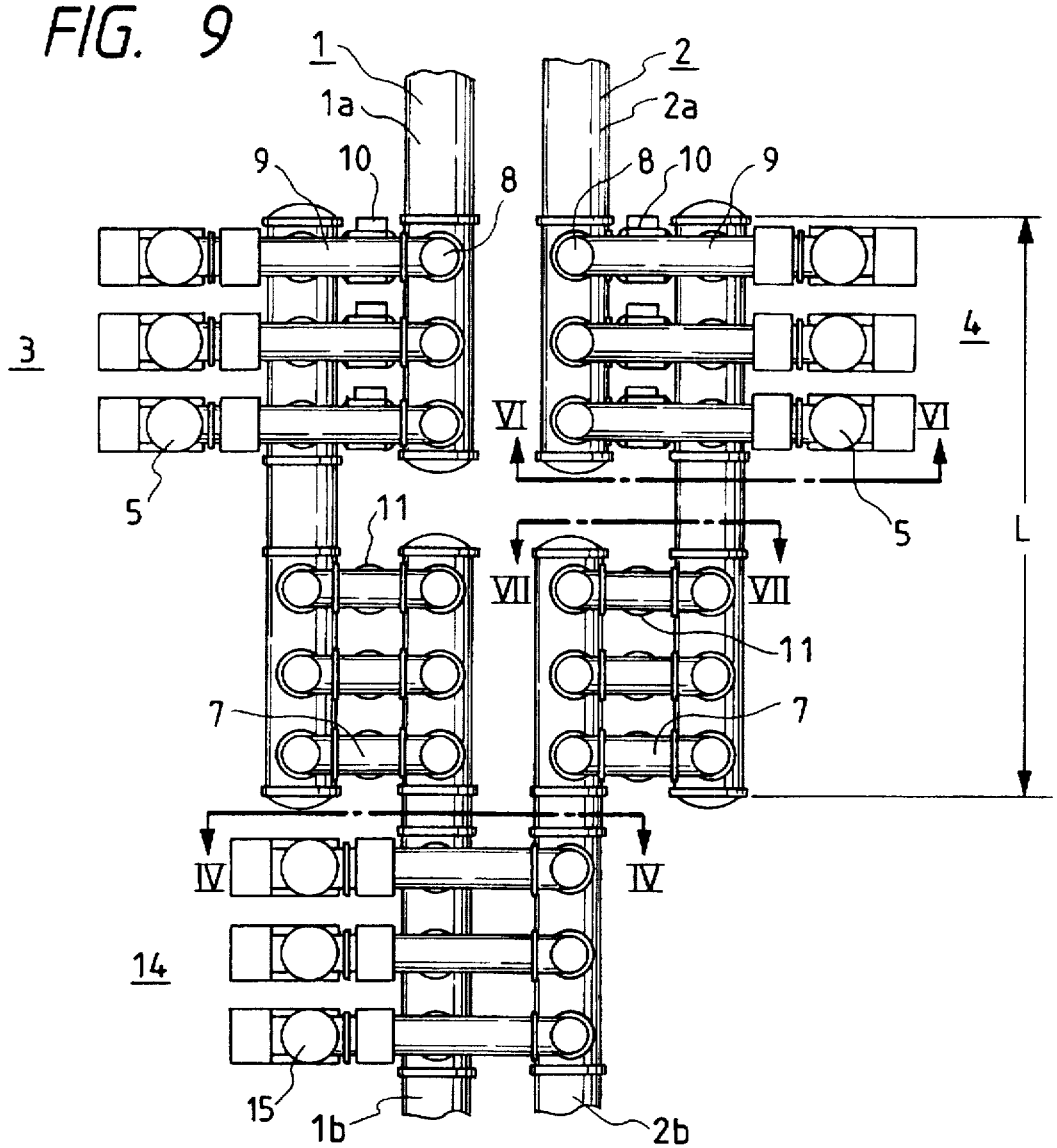
FIG. 9 is a plan view of a further embodiment in the gas insulated switchgear device according to the present invention.
Figure 12:
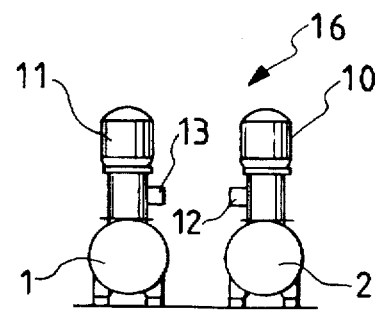
FIG. 12 a side elevation seen from the line XII—XII in FIG. 11 showing a prior art arrangement structure of the main bus connected $PT_S$ and the main bus working use $ES_S$ in the conventional gas insulated switchgear device.
Figure 10:
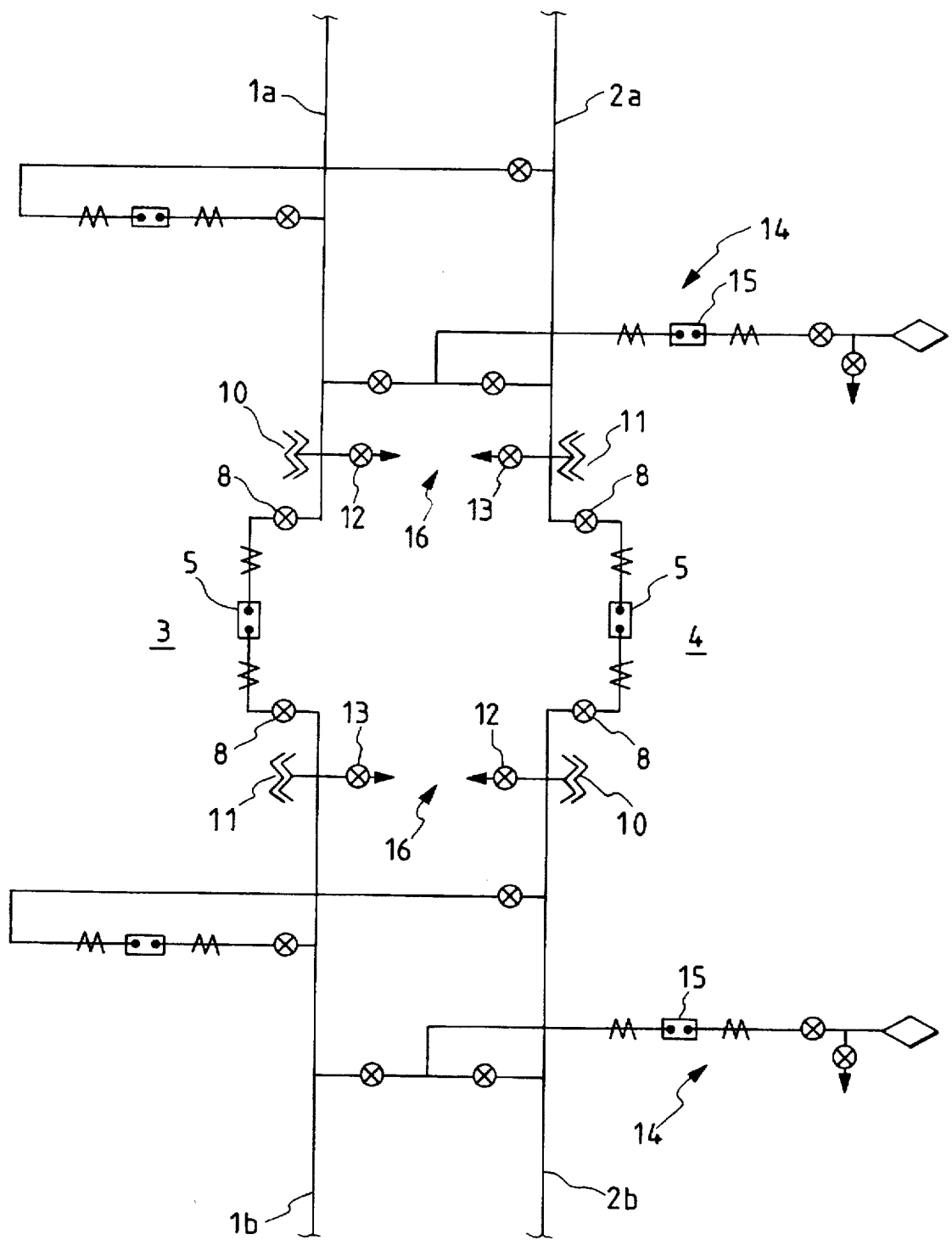
FIG. 10 is a prior art single line connecting diagram of bus sectioning units, main bus PT units and the portions nearby in a gas insulated switchgear device

FIG. 5 is the entire arrangement structure of the bus sectioning units 3 and 4 when the main bus connected $PT_s$ 10 and 11 are disposed at the side of the auxiliary buses 6 other than the main buses 1 and 2 as shown in FIGS. 6, 7 and 8, and as will be seen from the arrangement structure as shown in FIG. 5, the advantages of arranging the bus sectioning units 3 and 4 in rotation symmetry as has been explained above can not be any more enjoyed, therefore the respective bus sectioning units 3 and 4 can be constituted as shown in FIG. 9. Namely, the bus sectioning units 3 and 4 for the respective main buses 1 and 2 are arranged substantially in aligned symmetry with regard to the axial direction of the main buses 1 and 2.

Because the main bus connected $PT_s$ and the main bus working use $ES_s$ are concentratedly arranged in the respective bus sectioning units for the gas insulated switchgear device and the arrangement structure for the respective bus sectioning units is optimized, the entire arrangement structure of the gas insulated switchgear device can be compacted. Also the length of the main buses and the branching buses is shortened which greatly reduces the cost therefor.

We claim:

1. A gas insulated switchgear device of a double bus type which is accommodated in a metal container filled with $SF_6$ gas and which includes a first gas insulated main bus in the double bus disposed horizontally, a second gas insulated main bus in the double bus disposed horizontally and substantially in parallel with said first gas insulated main bus in the double bus, a first bus sectioning unit for sectioning said first gas insulated main bus in the double bus into a first main bus section and a second main bus section and a second bus sectioning unit for sectioning said second gas insulated main bus in the double bus into a first main bus section and a second main bus section, wherein said first sectioning unit comprises a first auxiliary bus disposed outside said first gas insulated main bus in the double bus in parallel with respective end portions of the first and second sections thereof, a first branching bus connecting one of the respective end portions of the first and second sections of said first gas insulated main bus in the double bus with one end of said first auxiliary bus via a first circuit breaker which is disposed outside said first auxiliary bus, a second branching bus connecting the other of the respective end portions of the first and second sections of said first gas insulated main bus in the double bus with the other end of said first auxiliary bus, a first main bus connected potential transformer and a first main bus use earthing switch, each provided along said first branching bus and a second main bus connected potential transformer and a second main bus use earthing switch, each provided along said second branching bus, and said second sectioning unit comprises a second auxiliary bus disposed outside said second gas insulated main bus in the double bus in parallel with respective end portions of the first and second sections thereof, a third branching bus connecting one of the respective end portions of the first and second sections of said second gas insulated main bus in the double bus with one end of said second auxiliary bus via a second circuit breaker which is disposed outside said second auxiliary bus, a fourth branching bus connecting the other of the respective end portions of the first and second sections of said second gas insulated main bus in the double bus with the other end of said second auxiliary bus, a third main bus connected potential transformer and a third main bus use earthing switch, each provided along said third branching bus and a fourth main bus connected potential transformer and a fourth main bus use earthing switch, each provided along said fourth branching bus.

2. The device of claim 1, wherein the corresponding elements in said second sectioning unit are disposed in rotation symmetry with respect to the elements in said first sectioning unit.

3. The device of claim 2, wherein said first and third main bus connected potential transformers are disposed between said first and second gas insulated main buses in the double bus.

4. The device of claim 1, wherein the corresponding elements in said second sectioning unit are disposed in axial symmetry with respect to the elements in said first sectioning unit with reference to an axial line running in parallel with and between said first and second gas insulated main buses in the double bus.

5. The device of claim 2, wherein said first main bus connected potential transformer is disposed between said first gas insulated main bus in the double bus and said first auxiliary bus and said third main bus connected potential transformer is disposed between said second gas insulated main bus in the double bus and said second auxiliary bus.

6. The device of claim 1, wherein said second and fourth main bus connected potential transformers are provided in either an upward or a downward direction on said respective second and fourth branching buses.

7. The device of claim 1, wherein said first and second gas insulated main buses in the double bus are three phase collective types and said first, second, third and fourth branching buses are phase isolated types.

* * * * *